(12) United States Patent
Pettersson

(10) Patent No.: US 10,875,521 B2
(45) Date of Patent: Dec. 29, 2020

(54) METHODS AND SYSTEM FOR OPERATING AN OFF-ROAD VEHICLE

(71) Applicant: Ford Global Technologies, LLC, Dearborn, MI (US)

(72) Inventor: Lars Niklas Pettersson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 16/124,622

(22) Filed: Sep. 7, 2018

(65) Prior Publication Data
US 2020/0079349 A1  Mar. 12, 2020

(51) Int. Cl.
| | |
|---|---|
| *B60W 20/15* | (2016.01) |
| *B60K 6/52* | (2007.10) |
| *B60K 6/547* | (2007.10) |
| *B60K 6/387* | (2007.10) |
| *B60K 6/36* | (2007.10) |

(52) U.S. Cl.
CPC .............. *B60W 20/15* (2016.01); *B60K 6/36* (2013.01); *B60K 6/387* (2013.01); *B60K 6/52* (2013.01); *B60K 6/547* (2013.01); *B60W 2510/0666* (2013.01); *B60W 2510/085* (2013.01); *B60W 2510/1035* (2013.01); *B60W 2540/00* (2013.01); *B60W 2555/00* (2020.02); *B60W 2710/0677* (2013.01); *B60Y 2200/92* (2013.01)

(58) Field of Classification Search
None
See application file for complete search history.

(56) References Cited

U.S. PATENT DOCUMENTS

| | | | |
|---|---|---|---|
| 6,307,276 B1 * | 10/2001 | Bader | B60K 6/48 180/65.25 |
| 6,580,178 B1 * | 6/2003 | Gale | F02N 11/04 123/339.14 |
| 2005/0060080 A1 | 3/2005 | Phillips et al. | |
| 2008/0125951 A1 | 5/2008 | Livshiz et al. | |
| 2018/0065619 A1 | 3/2018 | Kim et al. | |
| 2018/0251118 A1 * | 9/2018 | Gaither | F02D 29/06 |

* cited by examiner

*Primary Examiner* — Justin Holmes
(74) *Attorney, Agent, or Firm* — David Kelley; McCoy Russell LLP

(57) ABSTRACT

Systems and methods for operating a hybrid powertrain or driveline that includes an engine and an integrated starter/generator are described. In one example, engine power is adjusted based on a time averaged transmission input shaft power so that the engine may operate in a power region where its performance is enhanced to support operation in an off-road environment.

20 Claims, 6 Drawing Sheets

METHODS AND SYSTEM FOR OPERATING AN OFF-ROAD VEHICLE

FIELD

The present description relates to methods and a system for operating a powertrain of a hybrid vehicle. The methods and systems may be particularly useful for hybrid vehicles that may be driven off-road.

BACKGROUND AND SUMMARY

A vehicle may be driven off-road from time to time for work or enjoyment. The vehicle may experience terrain grades that are not present on paved or dirt roads. Further, the vehicle may encounter rock formations, rivers, creeks, and other natural obstacles that the vehicle's human driver may wish to negotiate. It may be desirable for the vehicle to respond with a significant amount of torque when the driver applies an accelerator pedal so that the driver has confidence that the vehicle may negotiate obstacles in the vehicle's path. One way to provide access to a significant amount of torque is to install a large displacement engine into the vehicle. However, the large displacement engine may consume large amounts of fuel during conditions when the driver does not need or expect significant increases in engine torque, during on-road conditions for example. Another way to provide significant amounts of engine torque may be to increase a rotational speed of a smaller displacement turbocharged engine when a driver demands torque during off-road conditions. However, delivery of torque from the smaller displacement engine may be delayed while the engine spins up to a higher level. Therefore, it may be desirable to provide a way of providing a desired powertrain response during off-road conditions without significant delay. Further, it may be desired for the approach to provide lower fuel consumption during on-road conditions.

The inventor herein has recognized the above-mentioned issues and have developed a powertrain operating method, comprising: adjusting power output of an engine via a controller according to a time averaged transmission input power, the time averaged transmission input power an averaged sum of engine power output and electric machine power output.

By adjusting power output of an engine according to a time averaged transmission input power, it may be possible to provide the technical result of improved powertrain response for smaller displacement engines. Specifically, adjusting engine power according to a time averaged transmission input power allows the engine to provide a base power level to the transmission while an electric machine may provide power to meet driver demand power that is not provided by the engine. Consequently, engine power may increase or decrease slower over a period of time so that engine power delivery is more consistent over the period of time. Further, the slower change in engine power output may allow the engine to operate at conditions where engine power output may be increased with little delay.

The present description may provide several advantages. In particular, the approach may improve powertrain performance during off-road conditions. Further, the approach may provide for low fuel consumption during on-road conditions. Further still, the approach may improve consistency of powertrain performance during off-road conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a powertrain or driveline of a vehicle. The approach may be applied to powertrains that include an electric machine that may selectively provide power to the powertrain to provide propulsive force to accelerate and decelerate vehicle wheels. The powertrain may also include another power source (e.g., an internal combustion engine) to provide power to the powertrain. The engine may be of the type shown in FIG. 1. The engine may be included in a powertrain of the types shown in FIGS. 2 and 3. Alternatively, the engine may be included in other types of series and parallel hybrid powertrain configurations. The powertrain may operate as shown in FIG. 4 according to the method of FIGS. 5 and 6. The method of FIGS. 5 and 6 adjusts power output of an internal combustion engine during off-road conditions to improve power delivery to vehicle wheels.

Figure 1:
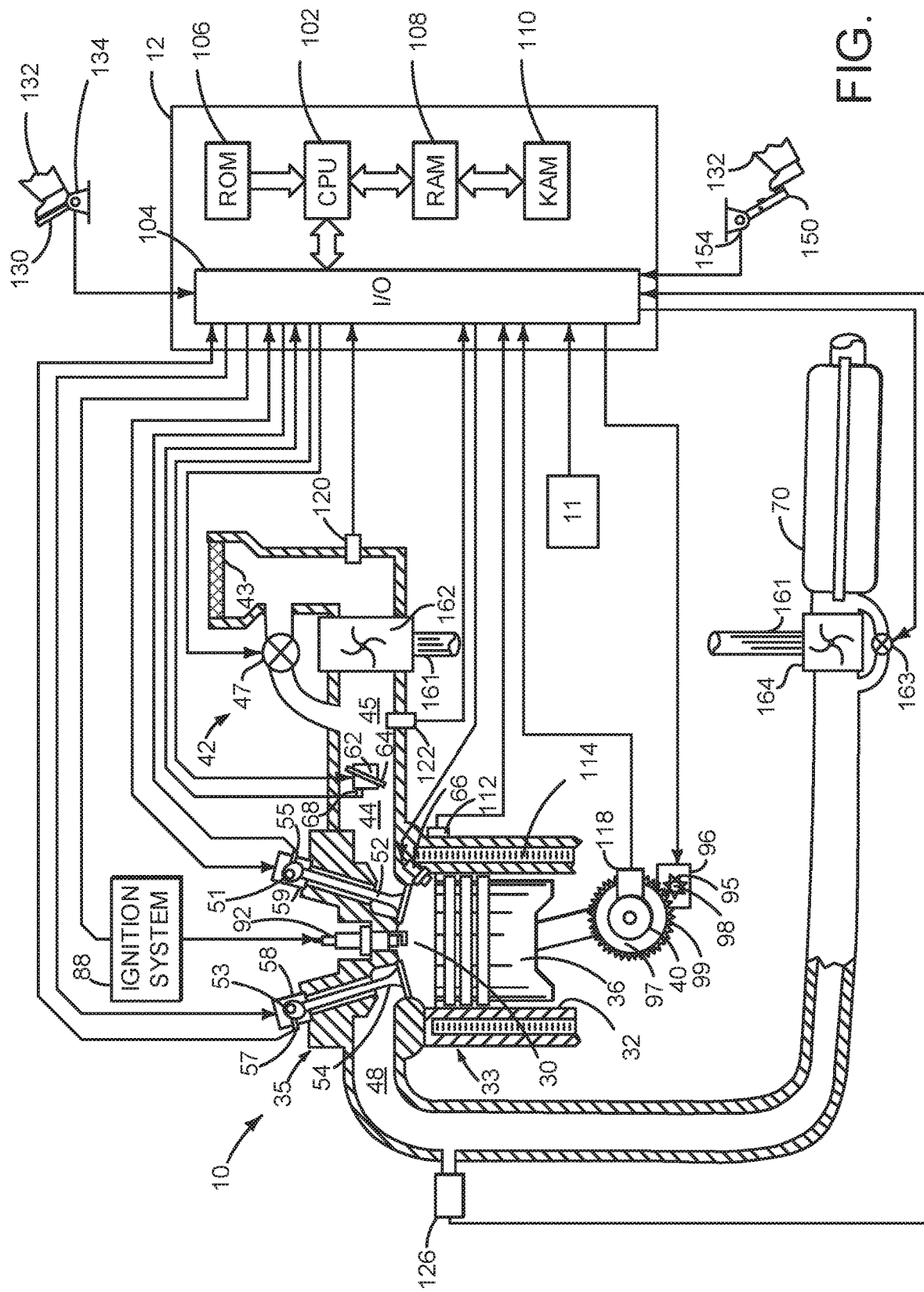
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3 and employs the actuators shown in FIGS. 1-3 to adjust engine and electric machine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. Additionally, a human driver may request two or four wheel drive via human/machine interface 11. Further, a human driver may request entry into or exit from off-road mode and on-road mode. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
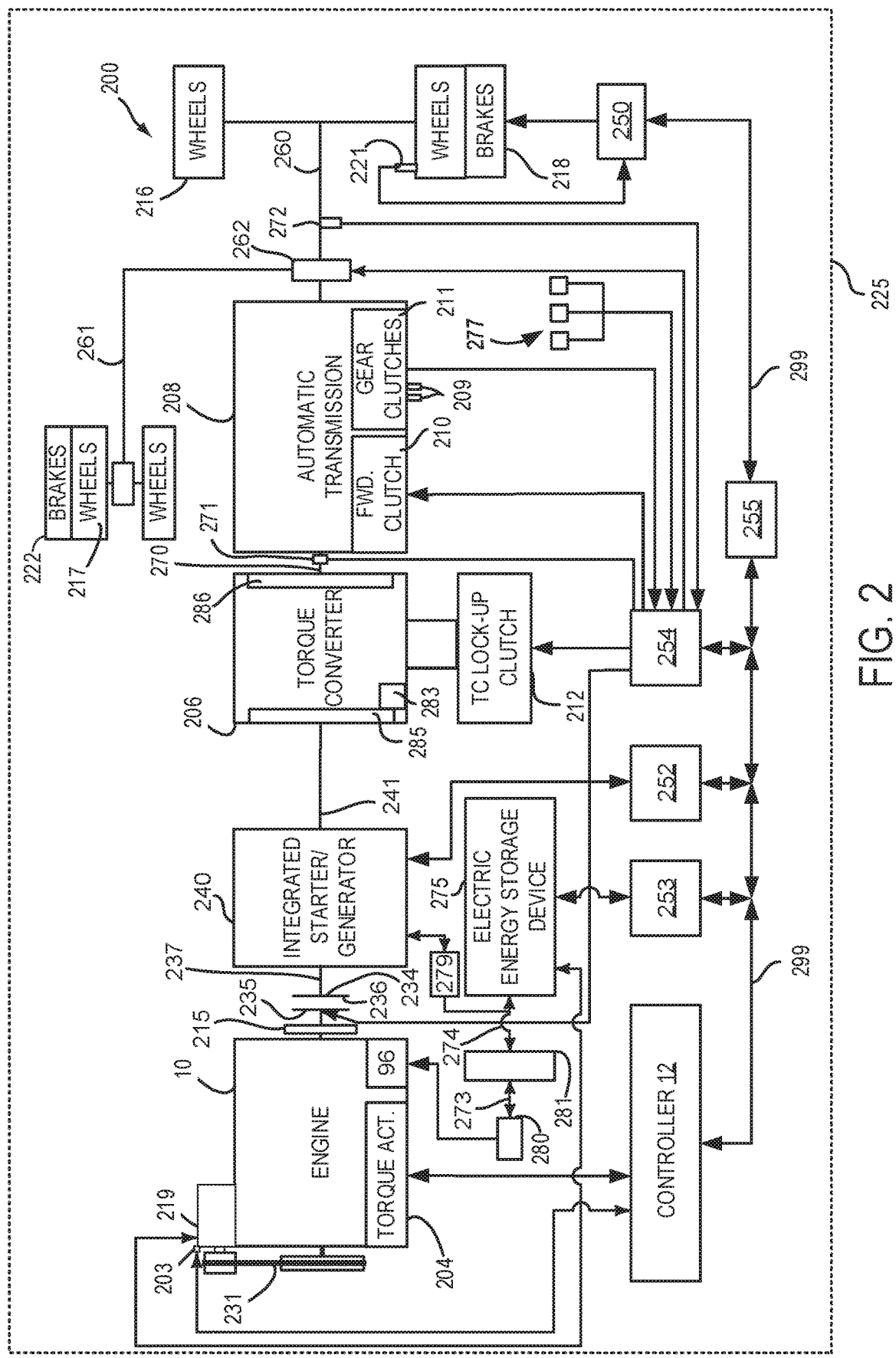
FIGS. 2 and 3 are schematic diagrams of hybrid vehicle drivelines or powertrains.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of powertrain controlling devices may be different than that shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator (BISG) 219, or via driveline integrated starter/generator (ISG) 240 also known as an integrated starter/generator. A speed of BISG 219 may be determined via optional BISG speed sensor 203. In some examples, BISG 219 may be simply referred to as an ISG. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG 219 may be mechanically coupled to engine 10 via belt 231 or other means. BISG 219 may be coupled to crankshaft 40 or a camshaft (e.g., 51 or 53 of FIG. 1). BISG 219 may operate as a motor when supplied with electrical power via electric energy storage device 275 or low voltage battery 280 via inverter 279. BISG 219 may operate as a generator supplying electrical power to electric energy storage device 275 or low voltage battery 280 via inverter 279. Bi-directional DC/DC converter 281 may transfer electrical energy from a high voltage buss 274 to a low voltage buss 273 or vise-versa. Inverter 279 is electrically coupled to high voltage bus 273 and ISG 240. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of rear wheels 216. Gear clutches 211 may be engaged or disengaged via adjusting fluid supplied to the clutches via shift control solenoid valves 209. Torque output from the automatic transmission 208 may be relayed to optional transfer case 262. Torque output from transmission 208 may be directed to front wheels 217 and rear wheels 216 when the vehicle is operated in a four wheel drive mode. Transmission controller 254 may selectively switch the driveline 200 from two wheel drive to four wheel drive and vice-versa via transfer case 262. Transfer case 262 may direct power to rear wheels 216 via shaft 260. Transfer case 262 may also direct power to front wheels 217 via shaft 261. Specifically, automatic transmission 208 may transfer an input driving torque at the input shaft 270 responsive to a vehicle traveling condition before transmitting an output driving torque to the rear wheels 216 and/or front wheels 217. Transmission controller 254 selectively activates or engages TCC 212, gear clutches 211, two and four wheel drive, and forward clutch 210. Transmission controller also selectively deactivates or disengages TCC 212, gear clutches 211, two and four wheel drive, and forward clutch 210.

Further, a frictional force may be applied to wheels 216 and 217 by engaging friction rear wheel brakes 218 and friction front wheel brakes 222. In one example, friction rear wheel brakes 218 and friction front wheel brakes 222 may be engaged in response to the driver pressing his/her foot on a brake pedal (not shown) and/or in response to instructions within brake controller 250. Further, brake controller 250 may apply brakes 218 and 222 in response to information and/or requests made by vehicle system controller 255. In the same way, a frictional force may be reduced to wheels 216 and 217 by disengaging wheel brakes 218 and 222 in response to the driver releasing his/her foot from a brake pedal, brake controller instructions, and/or vehicle system controller instructions and/or information. For example, vehicle brakes may apply a frictional force to wheels 216 and 217 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand power to the engine and the remaining fraction to the ISG or BISG. The driver demand power may be a combined power that is requested via the accelerator pedal and the brake pedal. For example, if the driver is requesting 1 kW (propulsion power may be positive) via the accelerator pedal and 0.5 kW (braking power may be negative) via the brake pedal, the driver demand power is 0.5 kW. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque) and 222. Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 and 222 so that the desired wheel torque is provided by a combination of negative wheel torque from friction brakes 218/222 and ISG 240.

Vehicle system controller may enter an off-road mode via input from the human/machine interface 11. The vehicle may change from a first transmission gear shift schedule (e.g., a transmission shift schedule may be a table or function that describes which gears are engaged and which gears are disengaged based on driver demand power and vehicle speed) to a second transmission gear shift schedule when entering an off-road mode from an on-road mode. The second transmission gear shift schedule may upshift at higher vehicle speeds so as to reduce transmission shifting during off-road conditions, or vice-versa. Further, the vehicle may enter four wheel drive mode and exit two wheel drive mode when entering off-road mode from an on-road mode, or vice-versa. Further still, the vehicle may change from a first mapping of accelerator pedal position to driver demand power (e.g., transmission input shaft power) to a second mapping of accelerator pedal positon to driver demand power when entering off-road mode from on-road mode, or vice-versa. The second mapping may increase the driver demand power at a faster rate relative to accelerator pedal position than the first mapping.

Accordingly, torque control of the various powertrain components may be supervised by vehicle system controller 255 with local torque control for the engine 10, transmission 208, electric machine 240, and brakes 218/222 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Figure 3:
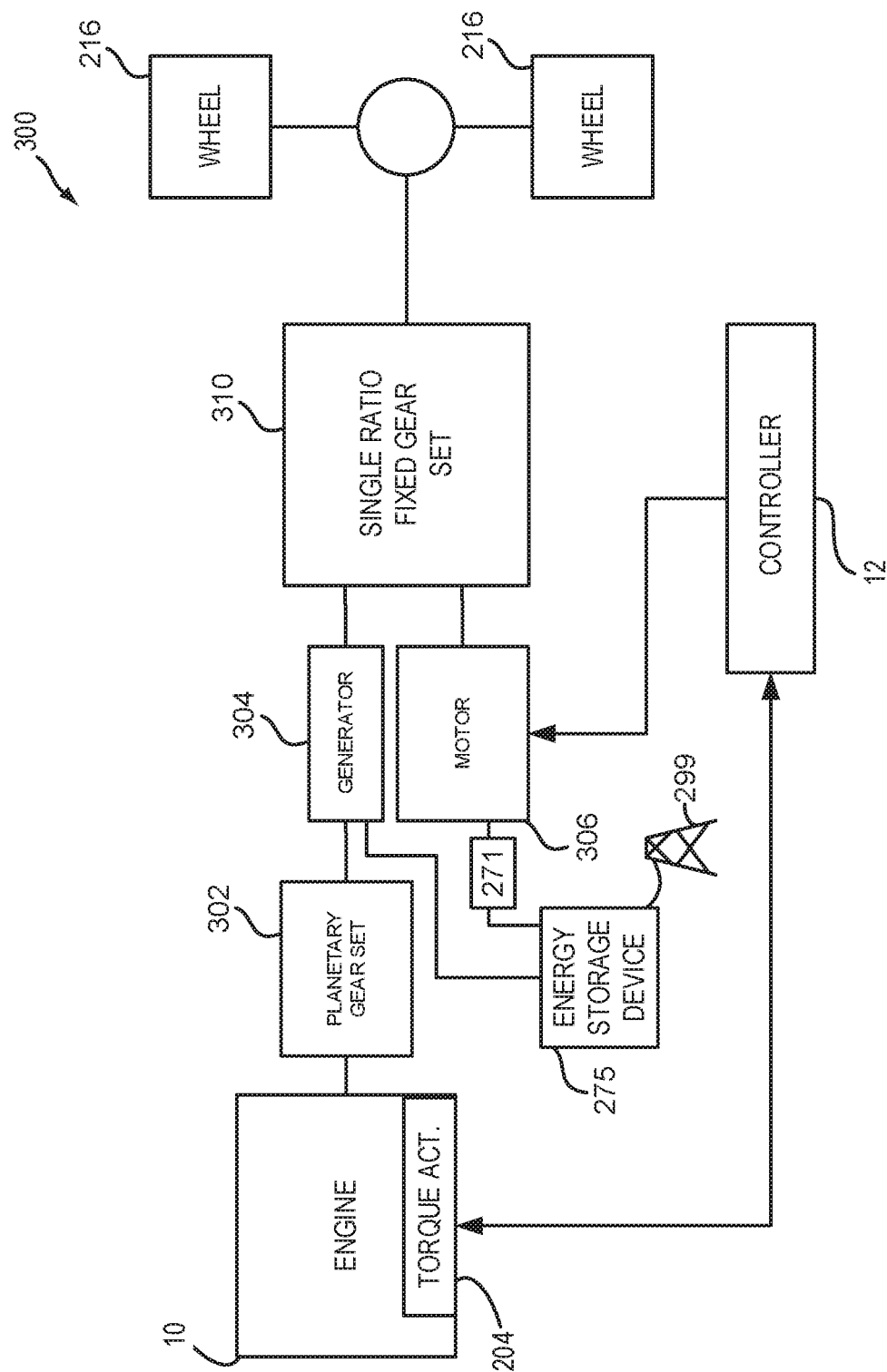
Figure 4:
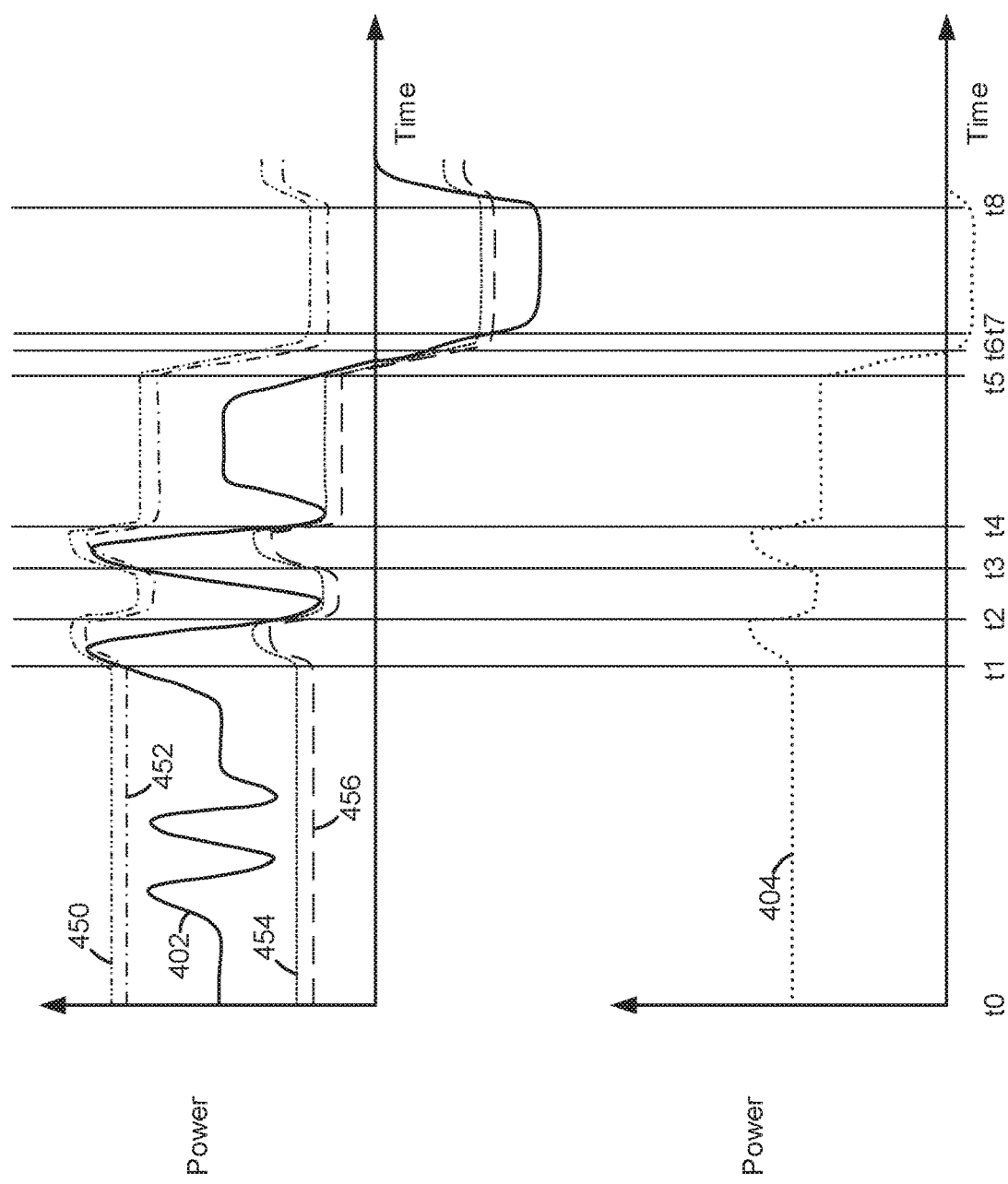
FIG. 4 shows an example powertrain operating sequence.

The system of FIGS. 1-3 provides for a system, comprising: an engine; an electric machine coupled to the engine; a controller including executable instructions stored in non-transitory memory to adjust engine output power according to a time averaged transmission input power in response to operating a vehicle in an off-road mode, where the off-road mode includes a second transmission gear shifting schedule, and where an on-road mode includes a first transmission gear shifting schedule. The system further comprises additional instructions to adjust engine output power according to the driver demand power and a high voltage system discharging power threshold. The system further comprises additional instructions to adjust engine output power according to the driver demand power and a high voltage system charging power threshold. The system includes where the electric machine is coupled to the engine via a disconnect clutch. The system includes where the electric machine is coupled to the engine via a gearbox. The system further comprises additional instructions to determine a vehicle is in an off-road mode.

Referring now to FIG. 4, example plots of a powertrain operating sequence are shown. The operating sequence may be performed via the system of FIGS. 1-3 in cooperation with the method of FIGS. 5 and 6. Vertical lines at times t0-t8 represent times of interest during the sequence. The plots in FIG. 4 are time aligned and occur at the same time.

The first plot from the top of FIG. 4 is a plot of power versus time. The vertical axis represents power (e.g., kilowatts (kW)) and power increases in the direction of the vertical axis arrow. The horizontal axis represents time and time increases from the left side of the plot to the right side of the plot. Trace 402 represents requested driver demand power (e.g., power requested input to a transmission, at the input shaft(s) of the transmission for example). Trace 450 represents a discharge upper threshold (e.g., a discharge value that is not to be exceeded) of a high voltage system (e.g., high voltage bus (274), inverter (279), electric energy storage device (275)). Trace 452 represents a preliminary discharge upper threshold (e.g., a discharge value that is not to be exceeded) of a high voltage system (e.g., high voltage bus (274), inverter (279), electric energy storage device (275)). This threshold is adjustable and it compensates for a lag in engine power such that the discharge upper threshold 450 need not be met while the system still meets the driver demand power. Trace 454 represents a preliminary charging threshold (e.g., a charging value that is not to be exceeded) of a high voltage system (e.g., high voltage bus (274), inverter (279), electric energy storage device (275)). This threshold is adjustable and it compensates for a lag in engine power such that the charging upper threshold 456 need not be met while the system still meets the driver demand power. Trace 456 represents a charging upper threshold (e.g., a charging value that is not to be exceeded) of a high voltage system (e.g., high voltage bus (274), inverter (279), electric energy storage device (275)).

The second plot from the top of FIG. 4 is a plot of power (kW) versus time. The vertical axis represents power and power increases in the direction of the vertical axis. The horizontal axis represents time and time increases from the left side of the figure to the right side of the figure. Trace 404 represents engine power.

At time t0, the driver demand power 402 and the engine power 404 are equal. The driver demand power is between the discharge threshold of the high voltage system and the charging threshold of the high voltage system. The preliminary discharge upper threshold is just below the discharge threshold and the preliminary charging threshold is just above the charging threshold.

Between time t0 and time t1, the driver demand power is increased and then it is decreased a first time and a second time. Light to medium level driver demand power changes do not cause engine power to be changed. The high voltage system power output increases as the ISG output changes to meet the change in driver demand power (not shown). The engine power output remains unchanged and constant. The discharge threshold level of the high voltage system and the charging threshold level of the high voltage system are unchanged. The preliminary discharge upper threshold level and the preliminary charging threshold level remain unchanged. Just before time t1, the driver demand power is increased by a large amount.

At time t1, engine power begins to increase in response to the time averaged transmission input power increasing. The engine power is increased when the driver demand power exceeds the preliminary discharge upper threshold level. The discharge threshold level of the high voltage system and the charging threshold level of the high voltage system are increased in response to the increase in driver demand power. The preliminary discharge upper threshold level and the preliminary charging threshold level are also increased in response to the increase in driver demand power.

Between time t1 and time t2, the engine power is centered about the discharge threshold level of the high voltage system and the charging threshold level of the high voltage system. The engine power is also centered about the preliminary discharge upper threshold level and the preliminary charging threshold level. The higher magnitude driver demand power is met by increasing the engine power, which is a time average value of the transmission input power. The transmission input power is the engine power plus the electric machine power. As time approaches time t2, the driver demand power is reduced.

At time t2, the engine power is lowered when the driver demand power is lower than the preliminary discharging power threshold of the high voltage system. The driver demand power is above the discharge power threshold of the high voltage system. The discharge threshold level of the high voltage system and the charging threshold level of the high voltage system are decreased in response to the decrease in driver demand power. The preliminary discharge upper threshold level and the preliminary charging threshold level are also decreased in response to the decrease in driver demand power.

Between time t2 and time t3, the driver demand power is increased again and the engine power is centered about the discharge threshold level of the high voltage system and the charging threshold level of the high voltage system. The engine power is also centered about the preliminary discharge upper threshold level and the preliminary charging threshold level. The higher magnitude driver demand power causes the engine power to cease decreasing because the engine power is adjusted to the time average value of the transmission input power. As time approaches time t3, the driver demand power is increased.

At time t3, engine power begins to increase again in response to the time averaged transmission input power increasing. The engine power is increased when the driver demand power exceeds the preliminary discharge upper threshold level a second time. The discharge threshold level of the high voltage system and the charging threshold level of the high voltage system are increased a second time in response to the increase in driver demand power. The preliminary discharge upper threshold level and the preliminary charging threshold level are also increased a second time in response to the increase in driver demand power.

Between time t3 and time t4, the engine power is centered about the discharge threshold level of the high voltage system and the charging threshold level of the high voltage system. The engine power is also centered about the preliminary discharge upper threshold level and the preliminary charging threshold level. The higher magnitude driver demand power is met by increasing the engine power, which is adjusted to a time average value of the transmission input power. As time approaches time t4, the driver demand power is reduced.

Between time t4 and time t5, the driver demand power is increased and then is decreased after it is held constant for a period of time. The driver demand power is reduced near time t5. The engine power levels off and it is constant as it approaches time t5. The discharge threshold level of the high voltage system and the charging threshold level of the high voltage system are decreased responsive to the driver demand power decrease. Likewise, the preliminary discharge upper threshold level and the preliminary charging threshold level are decreased responsive to the driver demand power decrease. The engine power is centered about the discharge threshold level of the high voltage system and the charging threshold level of the high voltage system. The engine power is also centered about the preliminary discharge upper threshold level and the preliminary charging threshold level.

At time t5, the engine power is decreased when the driver demand power is less than the preliminary charging threshold level. The discharging threshold level of the high voltage system and the charging threshold level of the high voltage system are decreased in response to the decrease in driver demand power. The preliminary discharge upper threshold level and the preliminary charging threshold level are also decreased in response to the decrease in driver demand power.

At time t6, the driver demand power is lower than (more negative) the preliminary charging threshold of the high voltage system and engine braking begins. The discharging threshold level of the high voltage system and the charging threshold level of the high voltage system are decreased further in response to the decrease in driver demand power. The preliminary discharge upper threshold level and the preliminary charging threshold level are also decreased further in response to the decrease in driver demand power.

At time t7, the driver demand power request is lower than the charging threshold of the high voltage system and maximum engine braking torque. Therefore, friction braking is applied to slow the vehicle and meet the driver demand power request. The discharging threshold level of the high voltage system and the charging threshold level of the high voltage system level off at constant values. The preliminary discharge upper threshold level and the preliminary charging threshold level also level off at constant values.

At time t8, the driver demand power is increased. The engine braking torque is reduced in response to the increase in driver demand power. Further, the discharging threshold level of the high voltage system and the charging threshold level of the high voltage system are increased further in response to the increase in driver demand power. Likewise, the preliminary discharge upper threshold level and the preliminary charging threshold level are also increased further in response to the increase in driver demand power.

In this way, engine output power may be adjusted according to a time averaged value of transmission input power. The engine power may be augmented by electric machine power to meet driver demand power, and engine power may evolve at a rate that allows the engine to operate at conditions that may facilitate driveline torque production. Accordingly, the engine may operate in a power output region that is less influenced by engine output delays. Further, the electric machine may compensate for lack of engine response to the driver demand power.

Figure 5:
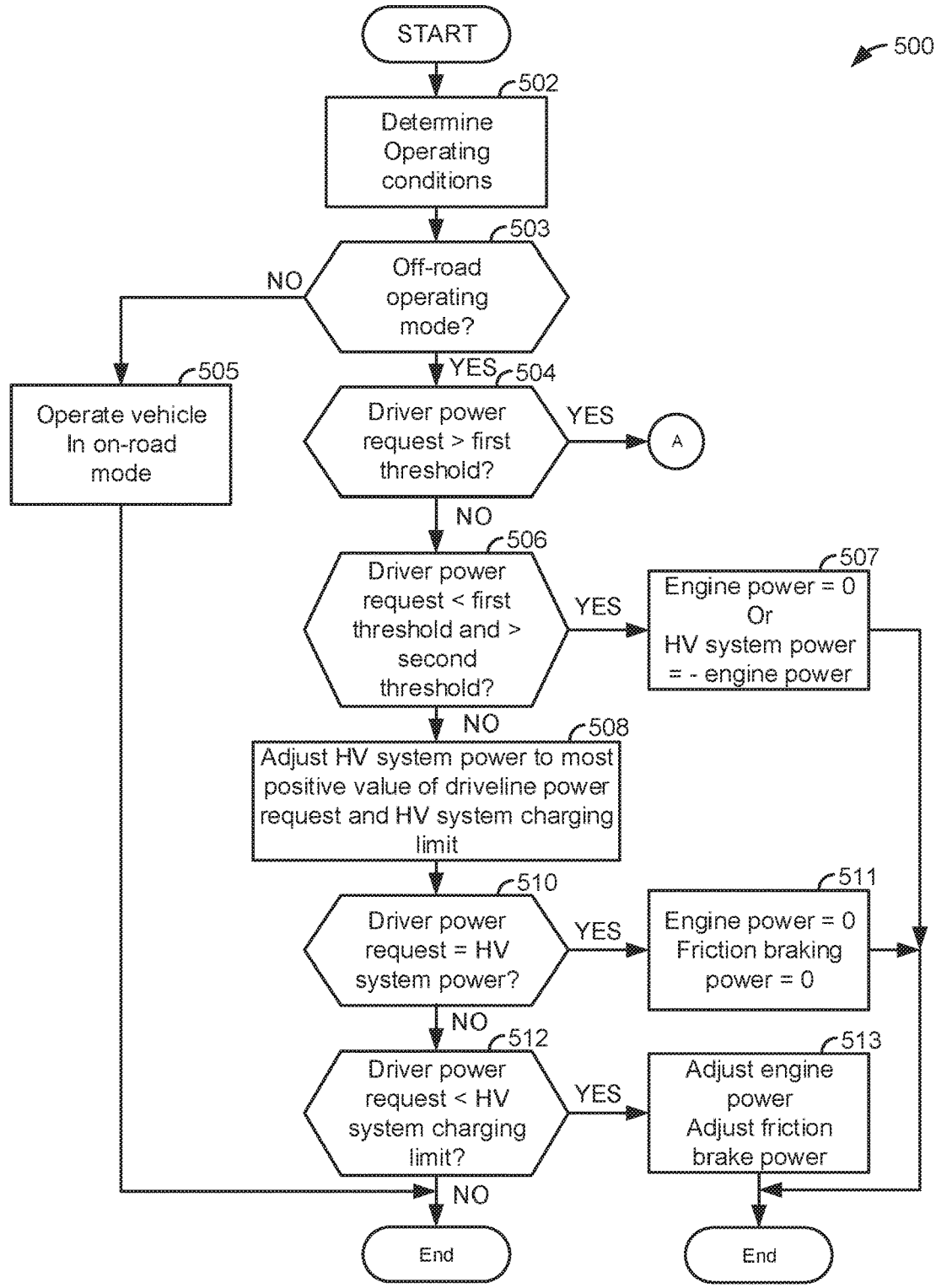
FIGS. 5 and 6 show an example method for operating a powertrain.

Referring now to FIG. 5, a flow chart of a method for operating a hybrid vehicle driveline is shown. The method of FIG. 5 may be incorporated into and may cooperate with the system of FIGS. 1-3. Further, at least portions of the method of FIG. 5 may be incorporated as executable instructions stored in non-transitory memory while other portions of the method may be performed via a controller transforming operating states of devices and actuators in the physical world.

At 502, method 500 determines operation conditions. Operating conditions may include but are not limited to engine speed, engine temperature, BISG torque, ISG torque, driver demand power, engine load, ambient temperature, ambient pressure, vehicle speed, and BISG speed. Method 500 proceeds to 503.

At 503, method 500 judges if it is desired for the vehicle to enter an off-road mode. In one example, method 500 may determine it is desired to enter an off-road mode based on driver input to a human/machine interface. If method 500 judges that it is desired for the vehicle to operate in an off-road mode, then the answer is yes and method 500 proceeds to 504 after determining that it is desired to operate the vehicle in an off-road mode. Otherwise, the answer is no and method 500 proceeds to 505 after determining that it is not desired for the vehicle to operate in off-road mode.

If method 500 judges that it is desired to operate the vehicle in an off-road mode, the transmission gears may be shifted according to a second shift schedule that is based on vehicle speed and driver demand power. Further, the vehicle may be switched into four wheel drive from two wheel drive. In addition, accelerator pedal input may be converted into driver demand power via a second table or function that is indexed or referenced via vehicle speed and accelerator pedal position.

At 505, method shifts the transmission gears according to a first shift schedule, the first shift schedule different from the second shift schedule. The first shift schedule may be based on vehicle speed and driver demand power. Further, the vehicle may be switched into two wheel drive from four wheel drive when engaging an on-road mode. In addition, accelerator pedal input may be converted into driver demand power via a first table or function that is indexed or referenced via vehicle speed and accelerator pedal position, the first table or function being different from the second table or function. Method 500 proceeds to exit.

At 504, method 500 judges if a driver demand power request is greater that a first threshold (e.g., 0 or a low power demand such as 50 watts). In one example, method 500 may determine a positive demand power based on accelerator pedal position and vehicle speed. Method 500 may also determine a negative demand power based on brake pedal position. The driver demand power may be a sum of the positive demand power and the negative demand power. If method 500 judges that the driver demand power is greater than the first threshold, then the answer is yes and method 500 proceeds to 520 after determining the driver demand power is greater than the first threshold. Otherwise, the answer is no and method 500 proceeds to 506 after determining that the driver demand torque is not greater than the first threshold.

At 506, method 500 judges if a driver demand power request is greater than a second threshold (e.g., −50 watts) and less than the first threshold. If method 500 judges that the driver demand power is greater than the second threshold and less than the first threshold, then the answer is yes and method 500 proceeds to 507 after determining the driver demand power is greater than the second threshold and less than the first threshold. Otherwise, the answer is no and method 500 proceeds to 508 after determining that the driver demand torque is not greater than the second threshold and less than the first threshold.

At 508, method 500 adjusts the power output of the high voltage system to the most positive of the driveline power request and the high voltage system charging limit (e.g., the value that is closest to a positive value). This operation may be described by the following equation:

$$HVpower = max(P\_lim\_ch, P\_request)$$

where HVpower is power output via the high voltage system (e.g., power input or output from the electric machine 240 and that may be limited by battery power capacity and inverter power capacity), max is a function that returns the greater value of argument (P_lim_ch) and of argument (P_request), P_lim_ch is a high voltage system charging threshold level that is not to be exceeded, and P_request is the driver demand power. Method 500 proceeds to 510.

At 510, method 500 judges if the driver demand power request is equal to the high voltage system power (e.g., P_request=HVpower). If method 500 judges that the driver demand power is equal to high voltage system power, then the answer is yes and method 500 proceeds to 511 after determining that the driver demand power is equal to the high voltage system power. Otherwise, the answer is no and method 500 proceeds to 512 after determining that the driver demand torque is not greater than the second threshold and less than the first threshold.

At 512, method 500 judges if the driver demand power request is less than the high voltage system charging threshold level that is not to be exceeded (e.g., P_request<P_lim_ch). If method 500 judges that the driver demand power is less than the high voltage system charging threshold level that is not to be exceeded, then the answer is yes and method 500 proceeds to 513 after determining that the driver demand power is less than the high voltage system charging threshold level that is not to be exceeded. Otherwise, the answer is no and method 500 proceeds to exit after determining that the driver demand torque is not less than the high voltage system charging threshold. This allows the system to charge to the maximum charging power of the high voltage system.

At 507, method 500 adjusts engine power to zero watts. Alternatively, if a battery or electric energy storage device needs charging, method 500 may adjust high voltage system power to a negative value of the engine power so that the electric machine converts all the engine power into electrical energy. Method 500 proceeds to exit.

At 511, method 500 adjusts engine power to zero and friction braking power to zero. Method 500 then proceeds to exit.

At 513, method 500 adjusts engine power and friction brake power. Specifically, the engine power is an engine braking power and it is expressed as:

$$Peng = max(Peng\_brk\_thr, (P\_request - HVpower))$$

where Peng is the engine power amount, Peng_brk_thr is an engine braking power threshold that is not to be exceeded, P_request is the driver demand power, and HVpower is the high voltage system power that is provided via the electric machine (e.g., 240). The engine is commanded to the power Peng and the engine braking power is negative. The friction braking power is determined via the following equation:

$$Pfric\_brk = abs(P\_request - HVpower - Peng)$$

where Pfric_brk is the friction braking power, abs is a function that returns an absolute value of the argument in parenthesis, P_request is the driver demand power, Peng is engine power, and HVpower is the high voltage system power. The friction braking power is positive. Method 500 proceeds to exit.

At 520, method 500 judges if a driver demand power request is greater than engine power. The engine power is the present engine power output. If method 500 judges that the driver demand power is greater than the engine power, then the answer is yes and method 500 proceeds to 530 after determining the driver demand power is greater than engine power. Otherwise, the answer is no and method 500 proceeds to 522 after determining that the driver demand torque is not greater than engine power.

At 522, method 500 judges if a driver demand power request is less than engine power. The engine power is the present engine power output. If method 500 judges that the driver demand power is less than the engine power, then the answer is yes and method 500 proceeds to 540 after determining the driver demand power is less than engine power. Otherwise, the answer is no and method 500 proceeds to 524 after determining that the driver demand torque is not less than engine power.

At 524, method 500 judges if a driver demand power request is equal to engine power. The engine power is the present engine power output. If method 500 judges that the driver demand power is equal to the engine power, then the answer is yes and method 500 proceeds to 550 after determining the driver demand power is equal to engine power. Otherwise, the answer is no and method 500 proceeds to exit after determining that the driver demand torque is not equal to engine power.

At 530, method 500 adjusts the power output of the high voltage system to the lowest value of the high voltage system discharging threshold and the driver demand power minus engine power. This operation may be described by the following equation:

$$HVpower = min(P\_lim\_dc, (P\_request - Peng))$$

where HVpower is power output via the high voltage system (e.g., the electric machine 240), min is a function that returns the lower value of argument (P_lim_dc) and of argument (P_request−Peng), P_lim_dc is a high voltage system discharging threshold level that is not to be exceeded, Peng is present engine power, and P_request is the driver demand power. Method 500 proceeds to 532.

At 532, method 500 judges if an absolute value of driver demand power request minus engine power is greater than an absolute value of a preliminary discharge upper threshold of the high voltage system. The engine power is the present engine power output. If method 500 judges that the absolute value of driver demand power request minus engine power is greater than an absolute value of a preliminary discharge upper threshold of the high voltage system, then the answer is yes and method 500 proceeds to 533 after determining that the absolute value of driver demand power request minus engine power is greater than an absolute value of a preliminary discharge upper threshold of the high voltage system. Otherwise, the answer is no and method 500 proceeds to exit after determining that the an absolute value of driver demand power request minus engine power is not greater than an absolute value of a preliminary discharge upper threshold of the high voltage.

At 533, method 500 adjusts the engine power to the driver demand power minus the preliminary discharge upper threshold of the high voltage system. The engine power may be expressed as:

$$Peng = P\_request - P\_pre\_dc$$

where Peng is engine power, P_request is driver demand power, and P_pre_dc is the preliminary discharge upper threshold of the high voltage system. Method 500 proceeds to 522 after adjusting the engine power via an actuator.

At 534, method 500 adjusts engine power to the time averaged value of transmission input shaft power. In one example, the engine power may be expressed as:

$$Peng\_filt(i) = (1-\alpha)Peng(i-1) + \alpha Ptrans(i)$$

where Peng_filt is the engine power, i is a sample or iteration value, a is a low-pass filter smoothing factor, and Ptrans is transmission input power. The transmission input power may be expressed as Ptrans(i)=Peng(i)+HVpower(i), where Peng is present engine output power and HVpower is present electric machine output power. The smoothing factor may be determined from a desired low-pass filter time constant τ via the equation:

$$\alpha = \frac{\frac{\Delta T}{\tau}}{\frac{\Delta T}{\tau} + 1},$$

where ΔT is the sample period, a is the smoothing factor, and τ is the desired low-pass filter time constant. The low-pass filter time constant may be modified by the vehicle's driver to achieve a desired engine response. Engine power is adjusted to the value of Peng_filt. Method 500 proceeds to 522.

At 540, method 500 adjusts the power output of the high voltage system to highest value of the high voltage system charging threshold and the driver demand power minus engine power. This operation may be described by the following equation:

$$HVpower = \max(P\_lim\_ch, (P\_request - Peng))$$

where HVpower is power output via the high voltage system (e.g., the electric machine 240), max is a function that returns the greater value of argument (P_lim_ch) and of argument (P_request-Peng), P_lim_ch is a high voltage system charging threshold level that is not to be exceeded, Peng is present engine power, and P_request is the driver demand power. Method 500 proceeds to 542.

At 542, method 500 judges if an absolute value of driver demand power request minus engine power is greater than an absolute value of a preliminary charging upper threshold of the high voltage system. The engine power is the present engine power output. If method 500 judges that the absolute value of driver demand power request minus engine power is greater than an absolute value of a preliminary charging upper threshold of the high voltage system, then the answer is yes and method 500 proceeds to 543 after determining that the absolute value of driver demand power request minus engine power is greater than an absolute value of a preliminary charging upper threshold of the high voltage system. Otherwise, the answer is no and method 500 proceeds to exit after determining that the an absolute value of driver demand power request minus engine power is not greater than an absolute value of a preliminary charging upper threshold of the high voltage.

At 543, method 500 adjusts the engine power to the driver demand power plus the absolute value of the preliminary charging upper threshold of the high voltage system. The engine power may be expressed as:

$$Peng = P\_request + abs(P\_pre\_ch)$$

where Peng is engine power, P_request is driver demand power, abs is a function that returns an absolute value of the argument, and P_pre_ch is the preliminary charging upper threshold of the high voltage system. Method 500 proceeds to 524 after adjusting the engine power via an actuator.

At 544, method 500 adjusts engine power to the time averaged value of transmission input shaft power. In one example, the engine power may be expressed as:

$$Peng\_filt(i) = (1-\alpha)Peng(i-1) + \alpha Ptrans(i)$$

where Peng_filt is the engine power determined from a time averaged transmission input power that is equal to engine power plus electric machine power, i is a sample or iteration value, a is a low-pass filter smoothing factor, and Ptrans is transmission input power. The transmission input power may be expressed as Ptrans(i)=Peng(i)+HVpower(i), where Peng is present engine output power and HVpower is present electric machine output power. Engine power is adjusted to the value of Peng_filt. Method 500 proceeds to 524.

At 524, method 500 judges if a driver demand power request is equal to the engine power. The engine power is the present engine power output. If method 500 judges that the driver demand power is equal to the engine power, then the answer is yes and method 500 proceeds to 550 after determining the driver demand power is equal to engine power. Otherwise, the answer is no and method 500 proceeds to exit after determining that the driver demand torque is not equal to engine power.

In this way, engine power may be adjusted to respond to larger changes in driver demand power and be less responsive to smaller changes in driver demand power. Further, engine power may be an average of transmission input power so that electric machine power may not be continuously relied upon to meet driver demand power.

Figure 6:
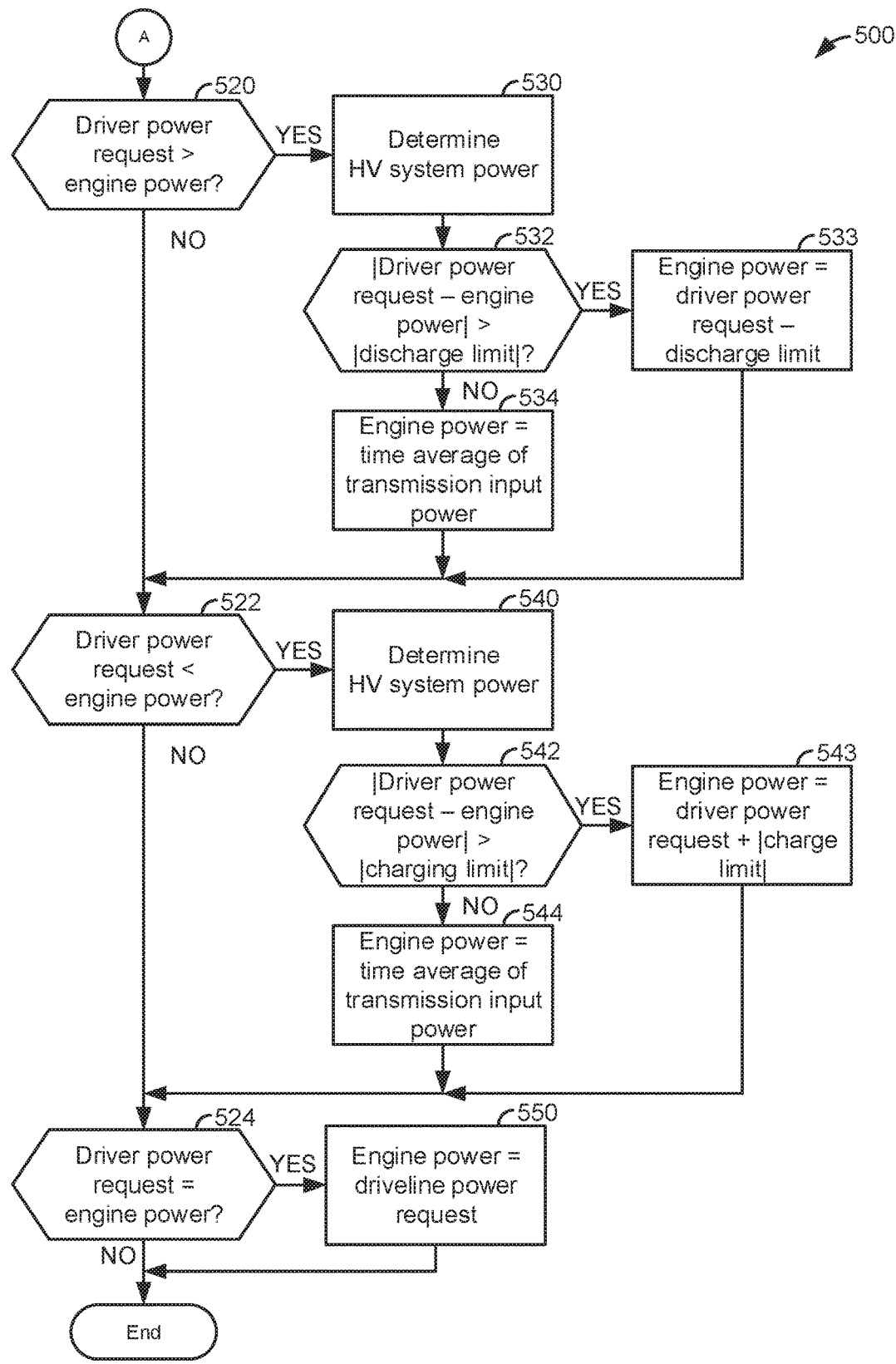

Thus, the method of FIGS. 5 and 6 provides for a powertrain operating method, comprising: adjusting power output of an engine via a controller according to a time averaged transmission input power, the time averaged transmission input power an averaged sum of engine power output and electric machine power output. The method includes where the averaged sum of engine power and electric machine power is averaged over a predetermined time interval. The method includes where the adjusting of power output of the engine is performed in an off-road vehicle operating mode. The method includes where the off-road vehicle operating mode includes a second transmission gear shifting schedule and where an on-road vehicle mode includes a first transmission gear shifting schedule, the first transmission gear shifting schedule different than the second transmission gear shifting schedule. The method includes where the adjusting of power output of the engine is performed in a four wheel drive vehicle operating mode. The method includes where the four wheel drive vehicle operating mode includes transferring engine torque to the vehicle's rear wheels and front wheels, and further comprising: not adjusting power output of an engine via a controller according to a time averaged transmission input power when a vehicle is in a two wheel drive mode. The method includes where power output of the engine is adjusted via an engine torque actuator. The method includes where the adjusting of power output of the engine is performed when a driver demand power is positive, and further comprising: not adjusting power output of an engine via a controller according to a time averaged transmission input power when the driver demand power is negative.

The method of FIGS. 5 and 6 also provides for a powertrain operating method, comprising: during conditions when a driver demand power is positive and the driver demand power is greater than an engine power output, adjusting an engine power output via a controller according to the driver demand power minus a power discharge threshold amount of a high voltage power system; and during conditions when the driver demand power is positive and the driver demand power is not greater than the engine power output, adjusting the engine power output via the controller according to a time averaged transmission input power, the time averaged transmission input power an averaged sum of the engine power output and an electric machine power output. The method further comprises during conditions when a driver demand power is positive and the driver demand power is less than an engine power output, adjusting power output of an engine via a controller according to the driver demand power plus an absolute value of a power charging threshold amount of the high voltage power system. The method further comprises adjusting the engine power output to a value of zero and adjusting friction braking power to a value of zero when the driver demand power is greater than a high voltage system threshold charging power. The method further comprises adjusting the engine power output to a value of an engine braking threshold power amount or the driver demand power minus a high voltage system power when the driver demand power is less than the high voltage system threshold charging power. The method further comprises adjusting engine power output to zero when driver demand power is zero. The method includes where the engine is couple to the electric machine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
  adjusting power output of an engine via a controller according to an averaged transmission input power, where the averaged transmission input power is an averaged sum of engine power output and electric machine power output.

2. The method of claim 1, where the averaged sum of engine power and electric machine power is averaged over a predetermined time interval.

3. The method of claim 1, where the adjusting of power output of the engine is performed in an off-road vehicle operating mode.

4. The method of claim 3, where the off-road vehicle operating mode includes a second transmission gear shifting schedule and where an on-road vehicle mode includes a first transmission gear shifting schedule, the first transmission gear shifting schedule different than the second transmission gear shifting schedule.

5. The method of claim 1, where the adjusting of power output of the engine is performed in a four wheel drive vehicle operating mode.

6. The method of claim 1, where the four wheel drive vehicle operating mode includes transferring engine torque to rear wheels and front wheels of a vehicle, and further comprising:
  not adjusting power output of an engine via a controller according to the averaged transmission input power when the vehicle is in a two wheel drive mode.

7. The method of claim 1, where power output of the engine is adjusted via an engine torque actuator.

8. The method of claim 1, where the adjusting of power output of the engine is performed when a driver demand power is positive, and further comprising:
  not adjusting power output of an engine via a controller according to the averaged transmission input power when the driver demand power is negative.

9. A powertrain operating method, comprising:
  during conditions when a driver demand power is positive and the driver demand power is greater than an engine power output, adjusting an engine power output via a controller according to the driver demand power minus a power discharge threshold amount of a voltage power system; and during conditions when the driver demand power is positive and the driver demand power is not greater than the engine power output, adjusting the engine power output via the controller according to an averaged transmission input power, where the averaged transmission input power is an averaged sum of the engine power output and an electric machine power output.

10. The method of claim 9, further comprising:

during conditions when a driver demand power is positive and the driver demand power is less than an engine power output, adjusting power output of an engine via a controller according to the driver demand power plus a power charging threshold amount of the voltage power system.

11. The method of claim 9, further comprising:

adjusting the engine power output to a value of zero and adjusting friction braking power to a value of zero when the driver demand power is greater than a voltage system threshold charging power.

12. The method of claim 11, further comprising:

adjusting the engine power output to a value of an engine braking threshold power amount or the driver demand power minus a voltage system power when the driver demand power is less than the voltage system threshold charging power.

13. The method of claim 9, further comprising adjusting engine power output to zero when driver demand power is zero.

14. The method of claim 9, where an engine is coupled to an electric machine.

15. A system, comprising:

an engine;

an electric machine coupled to the engine;

a controller including executable instructions stored in non-transitory memory to adjust engine output power according to an averaged transmission input power in response to operating a vehicle in an off-road mode, where the off-road mode includes a second transmission gear shifting schedule, and where an on-road mode includes a first transmission gear shifting schedule.

16. The system of claim 15, further comprising additional instructions to adjust engine output power according to a driver demand power and a voltage system discharging power threshold.

17. The system of claim 16, further comprising additional instructions to adjust engine output power according to the driver demand power and a voltage system charging power threshold.

18. The system of claim 15, where the electric machine is coupled to the engine via a disconnect clutch.

19. The system of claim 15, where the electric machine is coupled to the engine via a gearbox.

20. The system of claim 15, further comprising additional instructions to determine a vehicle is in an off-road mode.

* * * * *